United States Patent [19]

Marks et al.

[11] Patent Number: 5,447,895
[45] Date of Patent: Sep. 5, 1995

[54] STERICALLY SHIELDED DIBORON-CONTAINING METALLOCENE OLEFIN POLYMERIZATION CATALYSTS

[75] Inventors: Tobin J. Marks, Evanston; Li Ja, Chicago; Xinmin Yang, Evanston, all of Ill.

[73] Assignee: Northwestern University, Evanston, Ill.

[21] Appl. No.: 209,668

[22] Filed: Mar. 10, 1994

[51] Int. Cl.$^6$ ............................................. B01J 31/16
[52] U.S. Cl. ................................... 502/117; 502/103; 502/118; 502/202
[58] Field of Search ............... 502/103, 117, 118, 202, 502/129

[56] References Cited

U.S. PATENT DOCUMENTS

| | | | |
|---|---|---|---|
| 5,153,157 | 10/1992 | Hlatky et al. | 502/117 |
| 5,278,119 | 1/1994 | Turner et al. | 502/155 |

OTHER PUBLICATIONS

Organometallics 1991, 10, 840–842.
J. Am. Chem. Soc. 1991, 113, 3623–3625.
J. Am. Chem. Soc. 1991, 113, 8569–8570.
J. Am. Chem. Soc. 1991, 113, 8570–8571.

*Primary Examiner*—Shrive Beck
*Assistant Examiner*—Timothy H. Meeks
*Attorney, Agent, or Firm*—Richard P. Fennelly; Louis A. Morris

[57] ABSTRACT

A non-coordinating anion, preferably containing a sterically shielded diboron hydride, if combined with a cyclopenta-dienyl-substituted metallocene cation component, such as a zirconocene metallocene, is a useful olefin polymerization catalyst component. The anion preferably has the formula

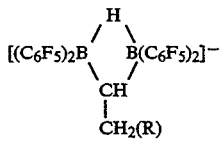

where R is branched lower alkyl, such as t-butyl.

12 Claims, No Drawings

STERICALLY SHIELDED DIBORON-CONTAINING METALLOCENE OLEFIN POLYMERIZATION CATALYSTS

This invention was made with Government support under Contract No. 86ER 13511 awarded by the Department of Energy. The Government has certain rights in this invention.

BACKGROUND OF THE INVENTION

Cationic $d^o$ metal complexes of the formula $L_2MCH_3^+$, where L is a cyclopentadienyl-type ligand and M is a Group IVB metal (titanium, zirconium, or hafnium) have been implicated as the active species in non-metallocene-based Ziegler-Natta olefin polymerization catalyst systems of the type $L_2MCl_2/Al_nCl_{3-n}$.

Interest in this type of catalyst resumed in the early 1980's and a variety of zirconocene complexes were found to form extremely active olefin polymerization catalysts when they were combined with methylaluminoxane (MAO). The activity increases with an increase of the Al/Zr ratio, while MAO itself cannot polymerize ethylene. The neutral compounds $L_2MR$ (where L is as defined above, M is lutetium or scandium) and $(L_2MH)_2$ (where M is lanthanum, neodymium, samarium, or lutetium), which are isoelectronic with $L_2MCH_3^+$ (where M is titanium, zirconium, or hafnium), were also found to be highly active ethylene polymerization catalysts. On the other hand, the cationic titanocene complex could be trapped by the insertion of TMSC≡CPh into the titanium-methyl bond. Unfortunately, such a cationic complex is catalytically inactive, possibly due to the bulkiness of the highly substituted vinyl ligand. Direct isolation of the cationic titanium methyl complex stabilized by conventional anions such as [BF$_4$] or [PF$_6$] can only be achieved from acetonitrile solutions resulting in the adducts of the formulae $(L_2MCH_3(CH_3CN))^+(BF_4)$ or $(L_2MCH_3(CH_3CN))^+(PF_6)^-$, where M is zirconium or titanium and L is a cyclopentadienyl-type ligand. These are deactivated due to the ligand coordination of acetonitrile. Attempts to exchange acetonitrile with a weaker base, e.g., tetrahydrofuran ("THF"), produces $L_2MFCH_3$ due to facile fluorine abstraction.

By using [BPh$_4$]$^-$ as the counterion, however, active cations can be obtained. The THF-coordinated cationic zirconocene complex of the formula $(L_2ZrCH_3(THF))^+(B(C_6H_5)_4)^-$ was isolated by the reaction of dicyclopentadienyl zirconium dimethyl with silver tetraphenylborate in acetonitrile followed by recrystallization from tetrahydrofuran. The NMR spectrum and the X-ray structure clearly show the coordination of the tetrahydrofuran. Tetrahydrofuran-coordinated cationic titanocene complexes of the formula $(L_2TiCH_3(THF))^+(B(C_6H_5)_4)^-$ were synthesized later. All of these complexes are weakly active ethylene polymerization catalysts ($N_t=7.2$ min$^{-1}$ and 1.9 min$^{-1}$, respectively, at room temperature). It is worth noting that a similar reaction does not take place for analogous thorium complexes under mild conditions.

While the concept of an active cationic center was established, research interest was gradually passing from confirming the cationic nature of the catalysts to searching for more active catalysts. The effect of base-coordination on the activity of the cationic catalysts has been studied systematically, and it is commonly believed that the coordination of the Lewis base decreases the catalytic activity of the cationic species. Extensive efforts to isolate base-free catalysts were undertaken. The pivotal concept of such research is to develop an anion which is bulky, highly stable, and noncoordinating to the cationic catalytic center, which exhibits very strong Lewis acidity and very high reactivity. Attempts at the isolation of the base-free cationic zirconocene complex, $(L_2ZrCH_3)^+(B(C_6H_5)_4)^-$, failed and produced instead the neutral compound, $L_2ZrCH_3(C_6H_5)$, by the ligand redistribution reaction between the anion and the cation. The Lewis base-free cationic thorium complex $(L_2ThCH_3)^+(B(C_6H_5)_4)^-$ was synthesized as the first example of the base free catalysts by quantitative protonolysis of the neutral thorium alkyl complex $L_2Th(CH_3)_2$ with $((C_2H_5)_3NH)^+B(C_6H_5)_4)^-$ in noncoordinating solvents. However, the low temperature solution NMR data and room temperature solid state NMR data show that the cation and the anion interact strongly with each other as a tight ionic pair. This could be the reason for the modest activity of the catalyst in ethylene polymerization ($N_t=1$ min$^{-1}$ at room temperature). Protonolysis of dicyclopentadienyl zirconium dimethyl with $((C_4H_9)_3NH)^+(B(C_6H_4R)_4)^-$, where R can be hydrogen, methyl, or ethyl, gives a zwitterion of the formula $L_2Zr^+(m-C_6H_3R)B(C_6H_4R)_3^-$. The activity of this catalyst for ethylene polymerization is $3.75 \times 10^5$ gPe/mol.atm.h. ($N_t=3.75s^{-1}$) at 80° C. The X-ray structure shows an agostic interaction between the cationic zirconium center and the C-H bond ortho to the boron.

The other type of noncoordinating anions that have been used are carborane-derived. Dicyclopentadienyl zirconium dimethyl reacts with the diprotic carborane complex nido-$C_6B_9H_{13}$, giving off methane and resulting in $(L_2ZrCH_3)^+(C_2B_9H_{12})^-$ as an active ethylene polymerization catalyst ($N_t=2.7s^{-1}$ at 40° C.). The X-ray structure shows that the cationic zirconium center is bound to the anion through a terminal hydride on the nido face of the anion. Metallocarboranes of the formula $(M(C_2B_9H_{11})_2)^-$, where M is iron, cobalt, or nickel are also stable anions for the zirconocene and thorocene cations. For example, $(L_2ZrCH_3)^+(M(C_2B_9H_{11})_2)^-$, where M can be one of the aforementioned metals, has an ethylene polymerization activity similar to that of $(L_2ZrCH_3)^+(C_2B_9H_{11})^-$, whereas similar thorium complexes, e.g., $(L_2ThCH_3)^+(Fe(C_2B_9H_{11}))_2^-$, are completely inactive for catalyzing ethylene polymerization due to strong Th-H-B interactions.

In general, both the $[B(C_6H_4R)_4]^-$ type anions and the carborane anions exhibit a significant degree of coordination to the cations, and this suppresses the catalytic activity.

The advantage for the use of perfluorinated tetraphenyl borate as the counteranion is that it can made the catalysts more stable, and meanwhile largely overcome strong anioncation interactions. This makes the olefin polymerization activity of the homogeneous characterizable metallocene catalysts comparable to the IVB transition metal complex/MAO catalyst systems and the heterogeneous catalyst systems. The difference in activity between the cations with the fluorinated anions and cations with the nonfluorinated anions is dramatic. For example, $(Me_5C_5)_2ThCH_3^+B(C_6F_5)_4^-$ has an ethylene polymerization activity 3300 times higher than of $(Me_5C_5)_2ThCH_3^+B(C_6H_5)_4^-$. An $^{19}F$ NMR spectroscopic study shows that the four phenyl groups on the borane are equivalent at temperatures as low as $-70°$ C.

in toluene-$d_8$ while the X-ray structure shows a weak coordinative/interaction between the cation and m- and o-fluorine atoms from one of the four phenyl groups. In the case of zirconium, the difference in activity is around several hundred times.

A wholly different and convenient way to generate the cationic species has also been reported. The neutral tris(pentafluorophenyl)borane can directly abstract a methide or hydride ligand from the neutral zirconocene complexes and thereby generate a cation and an anion. The NMR spectrum of $(L_2ZrCH_3)^+(CH_3B(C_6H_5)_3)^-$, where L in this case is 1,3-dimethylcyclopentadienyl shows two signals for the methyl groups on the cyclopentadienyl rings in toluene-$d_8$, indicating that the methyl groups are diastereotopic and the compound is a tight ion pair. The X-ray structure shows a weak linkage between the anion and cation through the abstracted methyl. This reaction also serves as a model for the generation of the cationic active centers in the heterogeneous system. The ethylene polymerization activity is $4.5 \times 10^6$ gPE/mol.atm.h. (Nt=45s$^{-1}$) at 25° C.

To summarize, base-free group IVB or thorium cationic metallocene species are the active centers for olefin polymerization. The more open, both sterically and coordinatively, the more active the cation is. And the stability and noncoordinativity of anions are the key to keeping the cations stable and open.

SUMMARY OF THE INVENTION

The present invention relates to a non-coordinating anion useful in olefin polymerization catalyst components which also contain a cyclopentadienyl-substituted metallocene cation component, which anion is a sterically shielded diboron-containing species and which is of the formula

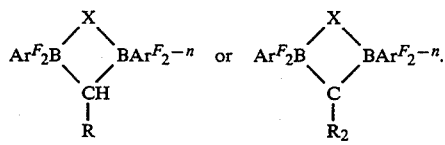

where R can be alkyl, fluoroalkyl, aryl, or fluoroaryl (and where two R groups are present, additionally hydrogen), Ar$^F$ is fluoroaryl, and X is either hydrogen or halide when n is 1. Preferably, the anion is of the formula

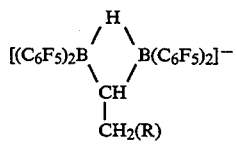

where R is branched lower alkyl. The Lewis acidity of two adjacent fluoroaryl groups, arrayed in a "chelating" geometry stabilizes the negative charge on the anion.

DESCRIPTION OF PREFERRED EMBODIMENTS

The synthesis of the preferred type of anion desired for use in the present invention begins with the double hydroboration of an alkyl-substituted acetylene reagent of the formula RCH≡CH, where R is branched lower alkyl, such as t-butyl. This is accomplished by using a boron dihalide hydroboration agent, such as $HBCl_2$. This can be generated in-situ using the corresponding $BX_2$ derivative and a silane (e.g., $Me_3SiH$) to yield the desired hydroboration product which is of the formula

where X is halo, such as chloro and R is branched lower alkyl, such as t-butyl.

The hydroboration product from the previously described step is then preferably reacted with lithium pentafluorophenyl which had been generated by the lithiation of bromopentafluorobenzene, under cooling conditions, to afford a reaction mixture which comprises a predominate amount of the following compound

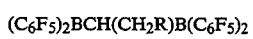

where R is as defined before.

The next step in the process is the delivery of a hydride moiety to the previously described compound by the reaction of such compound with, preferably, potassium triethyl borohydride in tetrahydrofuron (THF), to yield a product of the following formula:

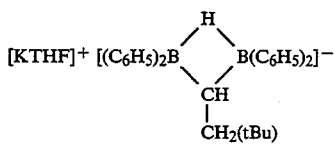

where R is as defined above.

The foregoing anion can be readily converted to its ammonium salt, as depicted in Example 4 hereinbelow, by reaction with a trialkylammonium halide ammoniating reagent, such as tributylammonium chloride, in an appropriate solvent, such as a hydrocarbon solvent, to yield the ammonium salt depicted in Example 4 hereinafter.

Once the ammonium salt, previously described, has been formed, it can be reacted with a cyclopentadienyl-substituted metallocene, such as dicyclopentadienyl zirconium dimethyl or analogous compounds where the zirconium atom has been substituted with another Group IVB metal, such as titanium or hafnium or an actinide metal, such as thorium, to yield the desired cationic species.

The present invention will be further understood by reference to the Examples which follow.

EXAMPLE 1

In this Example, as well as all those which follow, all procedures were performed under air-free and moisture-free conditions. Any solvents that were employed were distilled from sodium/potassium amalgam.

The compound $Cl_2BCH(CH_2tBu)BCl_2$, "tBu" meaning t-butyl, was synthesized by first dissolving t-butylacetylene (4.10 g, 0.050 mol) and trimethyl silane (3.75 g, 0.051 mol) in pentane (100 ml). The solution was cooled to $-78°$ C. and was then cannulated into a boron trichloride solution (52 ml, 1.0 M in hexanes) in a $-78°$ C. cold bath. The solution was stirred for two hours at $-78°$ C. and warmed up to room temperature. After the solvent was pumped away, the colorless liquid product was vacuum transferred at 80° C. and collected (yield 95%). H$^1$NMR(C$_6$D$_6$)=δ 0.63(9H), 1.83(d, 2H) 2.55 (b, 1H).

EXAMPLE 2

This Example illustrates the synthesis of a compound of the formula $(C_6F_5)_2BCH(CH_2tBu)B(C_6F_5)_2$ using the compound synthesized in Example 1.

$C_6F_5Br$ (12.6 g, 0.051 mol) was dissolved in 500 mL of pentane, and the solution was cooled to $-78°$ C. A solution of n-butyl lithium (32 mL, 1.6 M in hexanes) was then injected. After the mixture was stirred at $-78°$ C. for one hour, the compound from Example 1 (2.77 g, 0.011 mol) was added dropwise, and the mixture was then allowed to warm to room temperature over a period of twelve hours. The solution was filtered, and the solvent was removed under vacuum. The desired crude product (5.2 g) was obtained as a sticky yellowish oil (yield=60%). $^1H$ NMR($C_6D_6$): $\delta$ 0.76(s, 9H), 2.21(d, 2H), 3.53(b, 1H).

EXAMPLE 3

This Example illustrates preparation of the anion

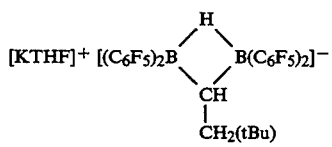

from the compound synthesized in Example 2.

The crude compound from Example 2 (3.87 g, 0.005 mol) was dissolved in 100 mL of toluene. A solution of $KEt_3BH$ (5 mL, 1.0 M solution in tetrahydrofuran, THF) was added dropwise to the solution at room temperature while the solution was stirred. After two hours, the solvent was removed, and the resulting yellow oil was washed twice with 50 mL of pentane. The solid was then dissolved in 20 mL of toluene and was then precipitated out with 100 mL of pentane. A solid white product (2.5 g) was obtained (yield =60%). $^1H$ NMR($C_6D_6$): $\delta$ 1.32(s, 9H), 1.39(t, 4H), 1.42(d, 2H), 2.19(b, 1H), 2.37 (b, 1H), 3.48 (t, 4H); $^{19}F$ NMR($C_6D_6$): $\delta$ $-130.8$ (b), $-133.7$(b), $-157.5$(t), $-158.0$(t), $-163.4$(b), $-163.8$(b).

EXAMPLE 4

The anion synthesized in Example 3 was converted to the ammonium salt of the formula

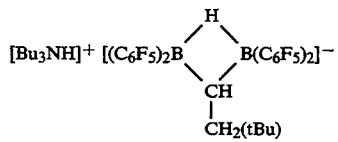

in this Example.

Equivalent quantities of the anion from Example 3 and $Bu_3NHCl$ were dissolved in toluene and were stirred for four hours. The solution was filtered, and pentane was added to precipitate a white product. The yield was almost quantitative. $^1H$ NMR($C_6D_6$): $\delta$ 0.69 (m, 9H), 0.88 (m, 12H), 1.30(s, 9H), 1.67(d, 2H), 2.18(m, 6H), 3.05(b, 1H); $^{19}F$ NMR($C_6D_6$): $\delta$ $-128.9$(b), $-131.3$(b), $-159.3$(t), $-159.8$(t), $-165.0$(t), $-165.4$(b). Anal. Calcd: C, 52.46; H, 4.30; N, 1.45. Found: C, 51.67; H, 4.14; N, 1.20.

EXAMPLE 5

The desired cationic complex useful in olefin polymerization was synthesized in this Example.

The compound synthesized in Example 4 (0.1922 g, 0.0002 mol) and bis(pentamethylcyclopentadienyl) thorium dimethyl (0.1064 g, 0.00021 mol) were loaded into a flask and then 20 mL of benzene was condensed into the flask under vacuum at $-78°$ C. While it was stirred, the mixture was allowed to warm up to room temperature. A white slurry was obtained. After filtration and solvent evaporation, 0.12 g of white solid was collected (yield=40%). $^1H$ NMR($C_6D_6$-$THFd_8$): $\delta$ 0.17 (s, 3H), 1.30(s, 9H), 1.62(s, 30H), 1.73(d, 2H), 2.27(b, 1H), 3.24(b, 1H); $^{19}F$ NMR: $\delta$ $-129.2$(b), $-131.4$(b), $-159.0$(t), $-159.5$(t), $-164.2$(b), $-164.8$(b). Anal. Calcd: C, 47.39; H, 3.59; N, 0.00; Found: C, 47.08; H, 3.35; N, 0.00.

EXAMPLE 6

In this Example the same procedure as employed in Example 5 was used except that toluene was used as the solvent.

The product was yellow. The yield was 50%. $^1H$ NMR($C_6D_6$-$THFd_8$): $\delta$ 0.00(s, 3H), 1.28(s, 9H), 1.43(s, 30H), 1.71(d, 2H), 2.24 (b, 1H), 3.23 (b, 1H); $^{19}F$ NMR: $\delta$ $-128.4$ (b), $-131.4$(d,b), $-160.6$(t), $-161.0$(t), $-165.8$(t,b), $-166.1$(b).

EXAMPLE 7

The polymerization of ethylene is shown in this Example using the catalyst synthesized in Example 5.

The catalyst from Example 5 (9 mg) was loaded in a flask in which 30 mL of benzene was condensed. Ethylene (1 atm) was charged into the flask at room temperature with vigorous stirring of the solution. The catalytic reaction was quenched by methanol after three minutes. After removing the solvent under high vacuum overnight, polyethylene (0.98 g) was obtained. The activity of the catalyst was calculated to be $2.80 \times 10^6$ gPE/mol atm h.

EXAMPLE 8

In this Example, polyethylene was synthesized using a catalyst generated in situ using the compound from Example 4 as one component thereof.

Catalyst was generated in situ by loading dicyclopentadienyl zirconium dimethyl (7 mg) and the compound of Example 4 (18 mg) into a flask and stirring the mixture in 30 mL of toluene for ten minutes at room temperature. Ethylene was then charged into the flask. It became impossible to stir in forty seconds due to the production of a large amount of polyethylene. The reaction was stopped by opening it to air. After removing the solvent under high vacuum overnight, polyethylene (0.82 g) was obtained. The activity was $4.04 \times 10^6$ g PE/mol atm h.

The foregoing Examples, which are presented herein for illustrative purposes only, should not be construed in a limiting sense for that reason. The scope of protection sought is set forth in the claims which follow.

We claim:

1. A catalyst system which is useful in olefin polymerization and which comprises: (1) a cyclopentadienyl-substituted metallocene cation component; and (2) a non-coordinating anion, which is a sterically shielded diboron-containing anion.

2. A catalyst system as claimed in claim 1 wherein the anion is of the formula

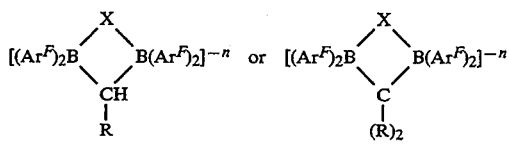

where R can be alkyl, fluoroalkyl, aryl, or fluoroaryl, and where two R groups are present, additionally hydrogen, $Ar^F$ is fluoroaryl, and X is either hydrogen or halide when n is 1.

3. A catalyst system as claimed in claim 1 wherein the anion is of the formula

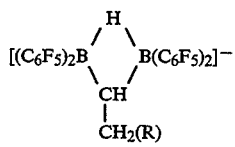

where R is branched lower alkyl.

4. A catalyst system as claimed in claim 3 wherein R is t-butyl.

5. A catalyst system useful in olefin polymerization as claimed in claim 1 which comprises a zirconocene metallocene as the metallocene cation component.

6. A catalyst system useful in olefin polymerization as claimed in claim 2 which comprises a zirconocene metallocene as the metallocene cation component.

7. A catalyst system useful in olefin polymerization as claimed in claim 3 which comprises a zirconocene metallocene as the metallocene cation component.

8. A catalyst system useful in olefin polymerization as claimed in claim 4 which comprises a zirconocene metallocene as the metallocene cation component.

9. A catalyst system useful in olefin polymerization as claimed in claim 1 which comprises a thorocene metallocene as the metallocene cation component.

10. A catalyst system useful in olefin polymerization as claimed in claim 2 which comprises a thorocene metallocene as the metallocene cation component.

11. A catalyst system useful in olefin polymerization as claimed in claim 3 which comprises a thorocene metallocene as the metallocene cation component.

12. A catalyst system useful in olefin polymerization as claimed in claim 4 which comprises a thorocene metallocene as the metallocene cation component.

* * * * *